US011892821B2

(12) United States Patent
Howells et al.

(10) Patent No.: US 11,892,821 B2
(45) Date of Patent: Feb. 6, 2024

(54) COMMUNICATION NODE TO INTERFACE BETWEEN EVALUATION SYSTEMS AND A MANUFACTURING SYSTEM

(71) Applicant: APPLIED MATERIALS, INC., Santa Clara, CA (US)

(72) Inventors: Michael Howells, San Jose, CA (US); Thorsten Kril, Santa Cruz, CA (US); Hemanth Konanur Nagendra, Santa Clara, CA (US); Jatinder Sasan, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/695,058

(22) Filed: Mar. 15, 2022

(65) Prior Publication Data
US 2023/0297072 A1    Sep. 21, 2023

(51) Int. Cl.
*G05B 19/18*     (2006.01)
*G05B 19/4155*   (2006.01)

(52) U.S. Cl.
CPC ....... *G05B 19/4155* (2013.01); *G05B 19/182* (2013.01); *G05B 2219/24015* (2013.01)

(58) Field of Classification Search
None
See application file for complete search history.

(56) References Cited

U.S. PATENT DOCUMENTS

| 2003/0049390 A1 | 3/2003 | Shanmugasundram |
| 2005/0090027 A1 | 4/2005 | Aghababazadeh |
| 2018/0165404 A1 | 6/2018 | Eyring |
| 2022/0179393 A1* | 6/2022 | Zhang ................ G05B 19/4065 |
| 2023/0195071 A1* | 6/2023 | Kazmierski ........ G05B 19/4183 |
| | | 700/121 |

FOREIGN PATENT DOCUMENTS

| JP | 2006277370 A | 10/2006 |
| KR | 20180129057 A | 12/2018 |

OTHER PUBLICATIONS

PCT Notification of Transmittal of the International Search Report and the Written Opinion of the International Searching Authority for PCT Application No. PCT/US23/15308, dated Jun. 14, 2023, 12 pages.

* cited by examiner

*Primary Examiner* — Ryan A Jarrett
(74) *Attorney, Agent, or Firm* — Lowenstein Sandler LLP

(57) ABSTRACT

An electronic device manufacturing system that includes a process tool and a tool server coupled to the process tool and comprising a communication node and an evaluation system. The communication node is configured to obtain one or more attributes from an evaluation system and provide a monitoring device comprising a data collection plan that is based on the one or more attributes. The communication node is further configured to register the monitoring device with a process tool. The communication node is further configured to receive, from the process tool, data based on the data collection plan and send the received data to the evaluation system.

19 Claims, 8 Drawing Sheets

COMMUNICATION NODE TO INTERFACE BETWEEN EVALUATION SYSTEMS AND A MANUFACTURING SYSTEM

TECHNICAL FIELD

The present disclosure relates to electrical components, and, more particularly, to a communication node to interface between one or more evaluation systems and a manufacturing system.

BACKGROUND

Products can be produced by performing one or more manufacturing processes using manufacturing equipment. For example, semiconductor manufacturing equipment (e.g., a process tool) can be used to produce semiconductor devices (e.g., substrates, wafers, etc.) via semiconductor manufacturing processes. The process tool can deposit a film on the surface of the substrate and can perform an etch process to form the intricate pattern in the deposited film. For example, the process tool can perform a chemical vapor deposition (CVD) process to deposit a film on the substrate. Sensors can be used to determine manufacturing parameters of the process tool during the manufacturing processes and a system controller can use controls to adjust these parameters to affect process results, and metrology equipment can be used to determine property data of the products that were produced by the process tool.

Tool data can be collected through Data Collection Plans (DCPs). In current systems, multiple different algorithms and machine learning models may require different types of tool data for particular purposes, and each algorithm and machine learning model may have custom DCPs. However, deploying or integrating different algorithms and machine learning models with a manufacturing system to execute the DCPs can be a difficult and time-consuming process. Therefore, a system capable of interfacing between the machine learning models and the manufacturing system is desirable.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, an electronic device manufacturing system includes a process tool and a tool server coupled to the process tool and comprising a communication node and an evaluation system. The communication node is configured to obtain one or more attributes from an evaluation system and provide a monitoring device comprising a data collection plan that is based on the one or more attributes. The communication node is further configured to register the monitoring device with a process tool. The communication node is further configured to receive, from the process tool, data based on the data collection plan and send the received data to the evaluation system.

A further aspect of the disclosure includes a method according to any aspect or embodiment described herein.

A further aspect of the disclosure includes a non-transitory computer-readable storage medium comprising instructions that, when executed by a processing device operatively coupled to a memory, performs operations according to any aspect or embodiment described herein.

A further aspect of the disclosure includes an electronic device manufacturing system having a process tool and a tool server coupled to the process tool and comprising a communication node and an evaluation system. The communication node is configured to receive, from a monitoring device registered on the process tool, data based on a data collection plan and send the received data to the evaluation system. The communication node is further configured to receive, from the evaluation system, feedback data based on the received data and cause the process tool to perform a corrective action based on the feedback data.

BRIEF DESCRIPTION OF THE DRAWINGS

The present disclosure is illustrated by way of example, and not by way of limitation in the figures of the accompanying drawings.

DETAILED DESCRIPTION

Figure 1:
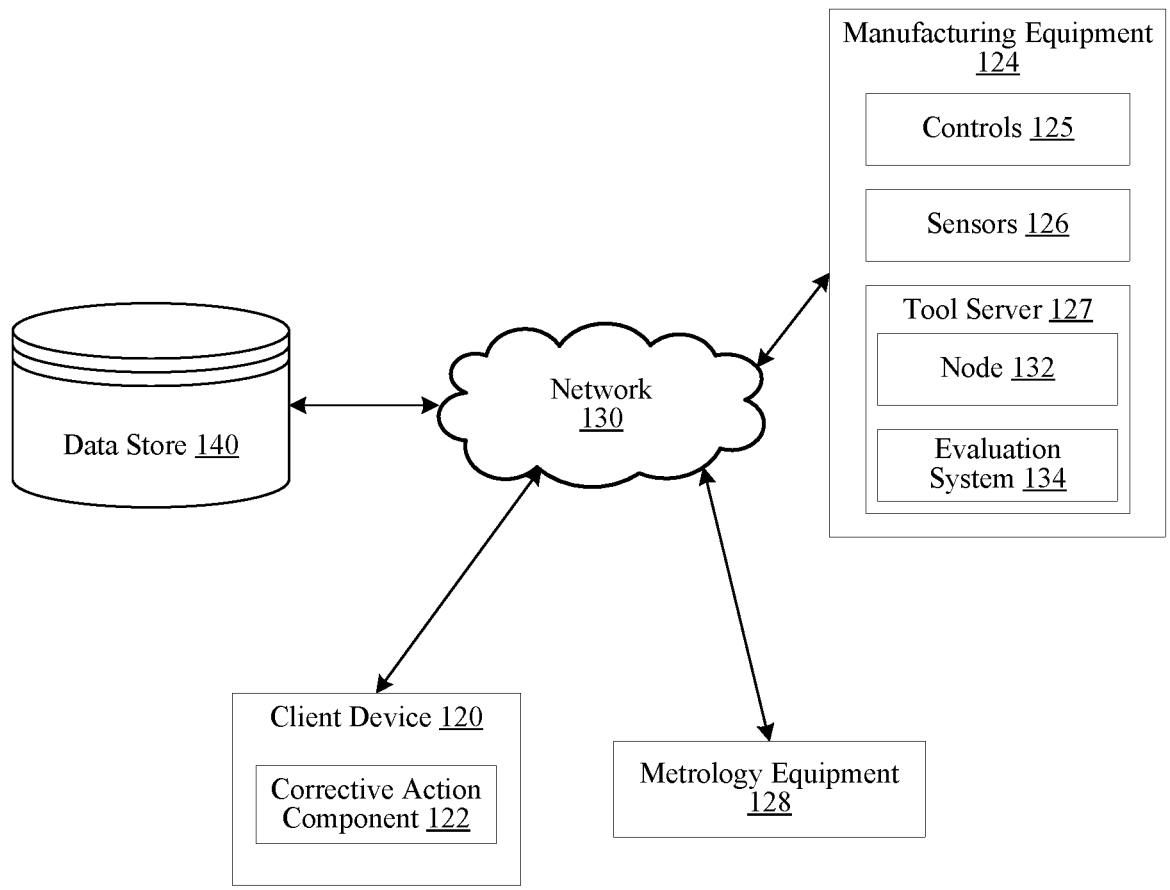
FIG. 1 is a block diagram illustrating an example system architecture, according to certain embodiments.

Described herein are technologies directed to a configurable data collection interface for evaluation systems. A data collection plan (DCP) is a procedure to collect system data, such as sensor data, event data, constants data, and settings data from a manufacturing system using a combination of pre-configured settings, parsing tool-generated configuration files, and information collected through communication with the manufacturing system.

A manufacturing system can include multiple process chambers. A process chamber can have multiple sub-systems operating during each substrate manufacturing process (e.g., the deposition process, the etch process, the polishing process, etc.). A sub-system can be characterized as a set of sensors and controls related with an operational parameter of the process chamber. An operational parameter can be a temperature, a flow rate, a pressure, and so forth. In an example, a pressure sub-system can be characterized by one or more sensors measuring the gas flow, the chamber pressure, the control valve angle, the foreline (vacuum line between pumps) pressure, the pump speed, and so forth. Accordingly, the process chamber can include a pressure sub-system, a flow sub-system, a temperature subsystem, and so forth.

The manufacturing system can collect the system data for maintenance, analytics, and predictive technologies performed by one or more evaluation systems (e.g., machine learning models, inference engines, heuristics models, algorithms, physics-based engine, etc.). For example, each sub-system can experience deterioration and deviate from optimal performance conditions, such as the pressure sub-system can generate reduced pressure due to one or more of pump issues, control valve issues, etc. Failure to catch and repair these deteriorating conditions can cause defects in the substrates, leading to inferior products, reduced manufacturing yield, and significant downtime and repair time.

In the current environment, many different evaluation systems may need to be deployed for data collection from a single manufacturing system. Each evaluation system can require different attributes (e.g., the type of system data desired by an evaluation system) and have different design parameters (e.g., be written in a different programming languages, use different communication interfaces, etc.). Additionally, some evaluation systems may require custom software deployment on and/or integration with the manufacturing system, which can cause the evaluation system to dedicate computing resources to the evaluation system. Accordingly, deploying or integrating evaluation systems with a manufacturing system can be a difficult and time-consuming process, and may consume computing resources of the manufacturing system, thus causing manufacturing delays or issues.

Aspects and implementations of the present disclosure address these and other shortcomings of the existing technology by implementing a communication node to interface between one or more evaluation systems and the manufacturing system. In particular, the communication node can query one or more evaluation systems about one or more attributes that each evaluation system needs to be obtained from the manufacturing system. The attributes can include any recordable data stored on or generated by the manufacturing system. For example, the attributes can include inputs used by the process tool of the manufacturing system, outputs generated from the process tool (e.g., metrology data, sensor data, metadata, time data, etc.), control modes, recipe set-points to be monitored (e.g., one or more processes during a recipe which trigger a data retrieval or recordation process by a tool server), equipment constants to be monitored, observable data on other tool sub-systems to be monitored, etc.

The communication node can then provide (e.g., generate, define, etc.) a monitoring device. A monitoring device can be any software program capable of retrieving or intercepting data from the manufacturing system. In some embodiments, the monitoring device can include a device driver, an application programming interface (API), a software application, a virtual device (e.g., a virtual peripheral device), an image file, firmware, etc. The communication node can configure, based on the received attributes, the monitoring device with a DCP to collect certain system data, such as sensor data, event data, constants data, and settings data from the manufacturing system.

The communication node can then register the monitoring device on the manufacturing system. In some embodiments, the communication tool can register the monitoring device on the frontend server software (FES) of the manufacturing system rather than on the real-time control system (e.g., the backend server) of the manufacturing system. A FES can be an extension of the backend server of the manufacturing system and can be used to channel requests received from other clients (e.g., the communication node). The monitoring device can be registered to only collect system data that is intended for the evaluation system(s), as indicated by the DCP. Using the monitoring device, the communication node can retrieve or receive the desired system data directly from the process tool. Further, registering the monitoring device with the FES enables the communication node to connect to the process tool without making any software changes to the process tool. The communication node can receive the collected data in real- or near real time, and send the collected data to the appropriate evaluation system. The evaluation system can process the collected data and generate feedback to be sent to the process tool and/or to an external system (e.g., a client device, an external server, etc.). The feedback data can include any meaningful finding that results from analyzing data. For example, the feedback data can include predictive data, diagnostic data (e.g., data indicative of an issue associated with the manufacturing equipment), a corrective action (suggested action or executable action to adjust a recipe parameter, adjust a process chamber parameter, etc.), optimization data (data indicative of how to optimize one or more parameters or components of the manufacturing equipment), efficiency data (e.g., how efficient is a component of a manufacturing equipment), health data indicative of the health of a sub-system of a process chamber, an alert, etc.

In some embodiments, the communication node can communicate with the evaluations systems and the manufacturing system using Remote Procedure Calls (RPCs). A RPC is a communication protocol that one computer program (e.g., software) located in one system can use to request a service from another computer program located in another system on a network without having to understand the network's details or the specifics of the other computer program.

Using the monitoring device and the DCP allows the communication node to receive targeted data from the manufacturing system. By receiving only the targeted data, the communication node can send, to an evaluation system(s) and/or to an external system(s), only the data desired rather than a collection of all of the raw data generated by the manufacturing system. This allows the evaluation system(s) and/or to an external system(s) immediately process the received data instead of first performing an extraction function to retrieve desired data from a collection of data. Furthermore, the DCP used by a monitoring device can be changed or updated by the communication node, thus allowing the communication node to dynamically change the type of data to retrieve from the manufacturing system Accordingly, aspects of the present disclosure result in technological advantages of enabling various evaluation systems to easily interface with a manufacturing system without requiring custom software deployment and/or back-end integration. In addition, aspects of the present disclosure result in technological advantages of significant reduction in time that it takes to obtain and process specific data, and perform an optimization of the parameters of a process recipe. The disclosed configuration allows for the manufacturing system to receive corrective actions with relative low latency. Aspects of the present disclosure further result in technological advantages of significant reduction in time to detect issues or failures experienced by a substrate during the manufacturing process, as well as improvements in energy consumption, and so forth. The present disclosure can also result in generating diagnostic data and performing corrective actions to avoid inconsistent and abnormal products, and unscheduled user time or down time.

FIG. 1 depicts an illustrative computer system architecture 100, according to aspects of the present disclosure. In some embodiments, computer system architecture 100 can be included as part of a manufacturing system for processing substrates, such as manufacturing system 200 of FIG. 2. Computer system architecture 100 includes a client device 120, manufacturing equipment 124, metrology equipment 128, and a data store 140. The manufacturing equipment 124 can include sensors 126 configured to capture data for a substrate being processed at the manufacturing system. In some embodiments, the manufacturing equipment 124 and sensors 126 can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system).

Manufacturing equipment 124 can produce products, such as electronic devices, following a recipe or performing runs over a period of time. Manufacturing equipment 124 can include a process chamber. Manufacturing equipment 124 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some embodiments, manufacturing equipment 124 includes sensors 126 that are configured to generate data associated with a substrate processed at manufacturing system 100. For example, a process chamber can include one or more sensors configured to generate spectral or non-spectral data associated with the substrate before, during, and/or after a process (e.g., a deposition process) is performed for the substrate. In some embodiments, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include temperature sensors, pressure sensors, flow rate sensors, voltage sensors, etc. Further details regarding manufacturing equipment 124 are provided with respect to FIG. 2.

In some embodiments, sensors 126 provide sensor data (e.g., sensor values, features, trace data) associated with manufacturing equipment 124 (e.g., associated with producing, by manufacturing equipment 124, corresponding products, such as wafers). The manufacturing equipment 124 can produce products following a recipe or by performing runs over a period of time. Sensor data received over a period of time (e.g., corresponding to at least part of a recipe or run) can be referred to as trace data (e.g., historical trace data, current trace data, etc.) received from different sensors 126 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

In some embodiments, manufacturing equipment 124 can include controls 125. Controls 125 can include one or more components or sub-systems configured to enable and/or control one or more processes of manufacturing equipment 124. For example, a sub-system can include a pressure sub-system, a flow sub-system, a temperature subsystem and so forth, each sub-system having one or more components. The component can include, for example, a pressure pump, a vacuum, a gas deliver line, a plasma etcher, actuators etc. In some embodiments, controls 125 can be managed based on data from sensors 126, input from control device 120, etc.

In some embodiments, manufacturing equipment 124 can include a tool server 127. Tool server 127 can include a communication node 132 that is configured to interface to the sensors 126 and the controls 125, and one or more evaluation systems 134. Evaluation system 134 can include any system capable of receiving input data and generating predictive data. For example, evaluation system 134 can include a machine learning model, an inference engine, a heuristics model, an algorithm, a physics-based engine, etc. Further details regarding tool server 127 are provided with respect to FIG. 2.

Metrology equipment 128 can provide metrology data associated with substrates processed by manufacturing equipment 124. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

Metrology equipment 128 can be included as part of the manufacturing equipment 124. For example, metrology equipment 128 can be included inside of or coupled to a process chamber and configured to generate metrology data for a substrate before, during, and/or after a process (e.g., a deposition process, an etch process, etc.) while the substrate remains in the process chamber. In some instances, metrology equipment 128 can be referred to as in-situ metrology equipment. In another example, metrology equipment 128 can be coupled to another station of manufacturing equipment 124. For example, metrology equipment can be coupled to a transfer chamber, such as transfer chamber 210 of FIG. 2, a load lock, such as load lock 220, or a factory interface, such as factory interface 206.

Figure 7:
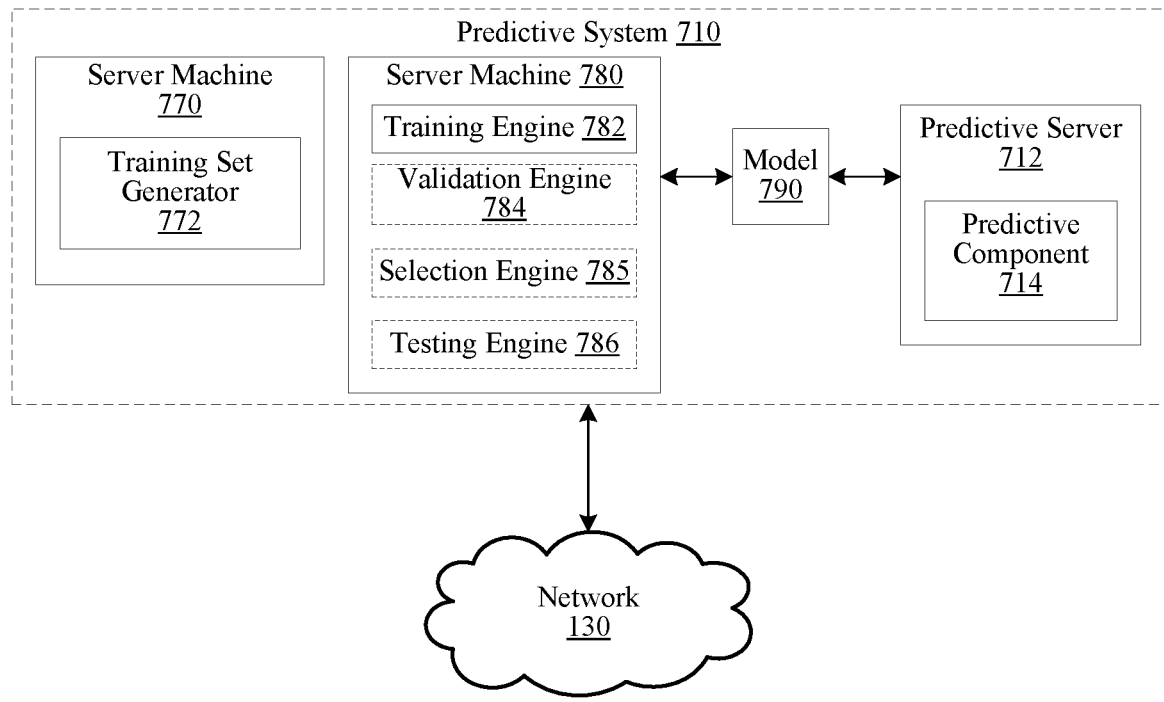
FIG. 7 depicts an illustrative predictive system, according to certain embodiments.

The client device 120 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data can be received from the client device 120. Client device 120 can display a graphical user interface (GUI), where the GUI enables the user to provide, as input, metrology measurement values for substrates processed at the manufacturing system. The client device 120 can include a corrective action component 122. Corrective action component 122 can receive user input (e.g., via a Graphical User Interface (GUI) displayed via the client device 120) of an indication associated with manufacturing equipment 124. In some embodiments, the corrective action component 122 transmits the indication to the predictive system 710, receives output (e.g., predictive data) from the predictive system 710 (as seen in FIG. 7), determines a corrective action based on the output, and causes the corrective action to be implemented. In some embodiments, the corrective action component 122 receives an indication of a corrective action from the predictive system 710 and causes the corrective action to be implemented. Each client device 120 can include an operating system that allows users to perform one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store can also store spectral data or non-spectral data associated with a portion of a substrate processed at manufacturing equipment 124. Spectral data can include historical spectral data and/or current spectral data.

The data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a process chamber.

The data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

In some embodiments, data store 140 can store expected profiles, thickness profiles, and corrections profiles. An expected profile can include one or more data points associated with a desired film profile expected to be produced by a certain process recipe. In some embodiments, an expected profile can include the desired thickness of the film. The thickness profile can include one or more data points associated with a current film profile generated by the manufacturing equipment 124. The thickness profile can be measured using metrology equipment 128. The correction profile can include one or more adjustments or offsets to be applied to the parameters of the process chamber or the process recipe. For example, the correction profile can include an adjustment to the temperature setting for the process chamber, the pressure setting for the process chamber, the flow rate setting for a precursor for a material included in the film deposited on the substrate surface, to the power supplied to the process chamber, to the ratio of two or more settings, etc. The correction profiles can be generated by comparing the expected profile (e.g., the thickness profile expected to be generated by the process recipe), and determining, using a library of known fault patterns and/or an algorithm, the adjustment to be applied to the parameters of the process recipe to achieve the expected profile. The correction profiles can be generated as output from evaluation system 134. The correction profiles can be applied to steps associated with the deposition process, the etch process, etc.

In some embodiments, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some embodiments, all data stored at data store 140 can be inaccessible by the user of the manufacturing system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores.

In some embodiments, data store 140 can be configured to store data associated with known fault patterns. A fault pattern can be a one or more values (e.g., a vector, a scalar, etc.) associated with one or more issues or failures associated with a process chamber sub-system. In some embodiments, a fault pattern can be associated with a corrective action. For example, a fault pattern can include parameter adjustment steps to correct the issue or failure indicated by the fault pattern. For example, the predictive system can compare a determined fault pattern to a library of known fault patterns to determine the type of failure experienced by a sub-system, the cause of the failure, the recommended corrective action to correct the fault, and so forth.

The client device 120, manufacturing equipment 124, sensors 126, metrology equipment 128, tool server 127, and data store 140 can be coupled to each other via a network 130. In some embodiments, network 130 is a public network that provides client device 120 with access to manufacturing equipment 124, data store 140, and other publicly available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

Figure 2:
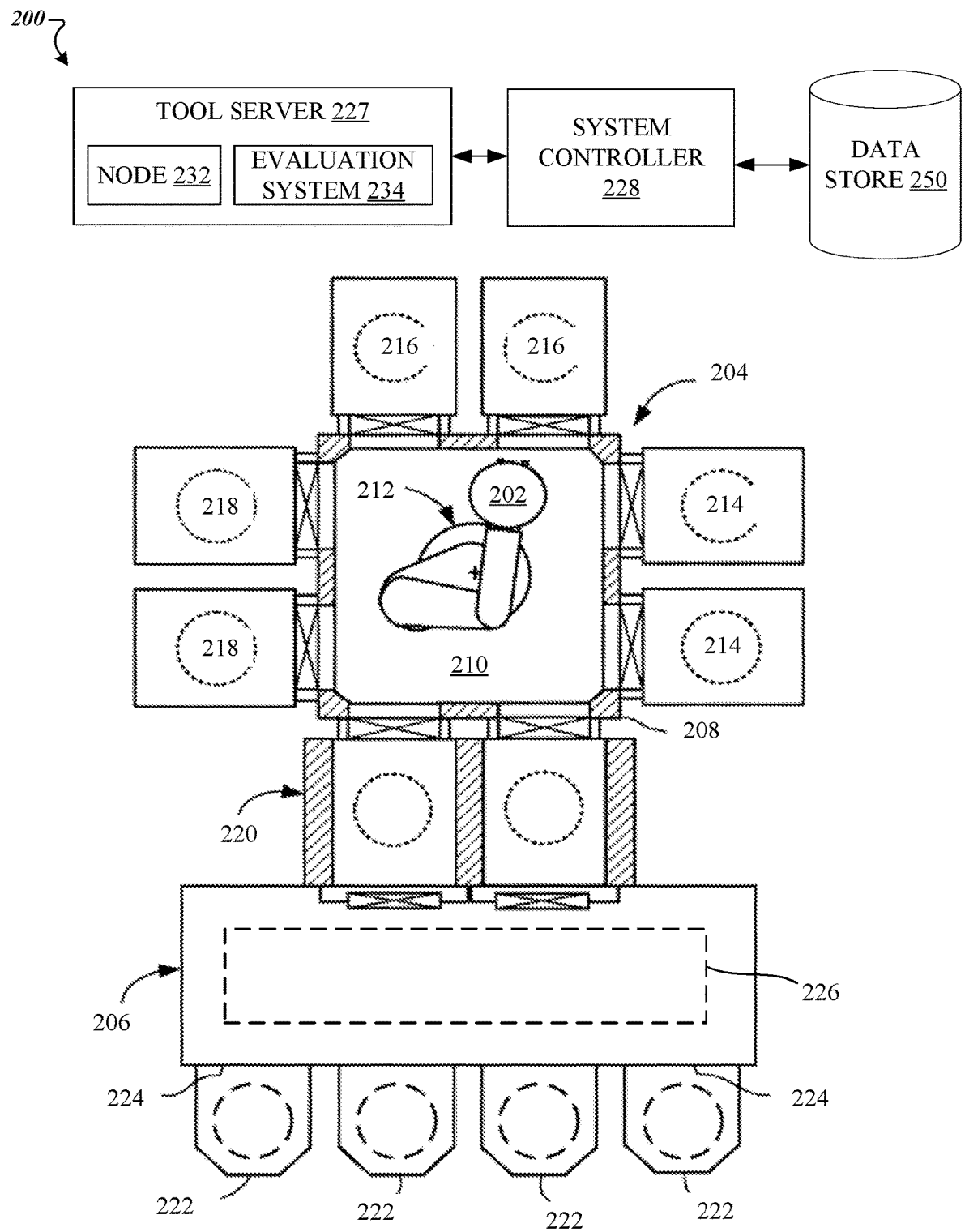
FIG. 2 is a top schematic view of an example manufacturing system, according to certain embodiments.

FIG. 2 is a top schematic view of an example manufacturing system 200, according to aspects of the present disclosure. Manufacturing system 200 can perform one or more processes on a substrate 202. Substrate 202 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 200 can include a process tool 204 and a factory interface 206 coupled to process tool 204. Process tool 204 can include a housing 208 having a transfer chamber 210 therein. Transfer chamber 210 can include one or more process chambers (also referred to as processing chambers) 214, 216, 218 disposed therearound and coupled thereto. Process chambers 214, 216, 218 can be coupled to transfer chamber 210 through respective ports, such as slit valves or the like. Transfer chamber 210 can also include a transfer chamber robot 212 configured to transfer substrate 202 between process chambers 214, 216, 218, load lock 220, etc. Transfer chamber robot 212 can include one or multiple arms where each arm includes one or more end effectors at the end of each arm. The end effector can be configured to handle particular objects, such as wafers, sensor discs, sensor tools, etc.

Process chambers 214, 216, 218 can be adapted to carry out any number of processes on substrates 202. A same or different substrate process can take place in each processing chamber 214, 216, 218. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 214, 216, 218 can each include one or more sensors configured to capture data for substrate 202 before, after, or during a substrate process. For example, the one or more sensors can be configured to capture spectral data and/or non-spectral data for a portion of substrate 202 during a substrate process. In other or similar embodiments, the one or more sensors can be configured to capture data associated with the environment within process chamber 214, 216, 218 before, after, or during the substrate process. For example, the one or more sensors can be configured to capture data associated with a temperature, a pressure, a gas concentration, etc. of the environment within process chamber 214, 216, 218 during the substrate process. In some embodiments, process chamber 214, 216, 218 can include metrology equipment 240.

A load lock 220 can also be coupled to housing 208 and transfer chamber 210. Load lock 220 can be configured to interface with, and be coupled to, transfer chamber 210 on one side and factory interface 206. Load lock 220 can have an environmentally-controlled atmosphere that can be changed from a vacuum environment (wherein substrates can be transferred to and from transfer chamber 210) to an at or near atmospheric-pressure inert-gas environment (wherein substrates can be transferred to and from factory interface 206) in some embodiments. Factory interface 206 can be any suitable enclosure, such as, e.g., an Equipment Front End Module (EFEM). Factory interface 206 can be configured to receive substrates 202 from substrate carriers 222 (e.g., Front Opening Unified Pods (FOUPs)) docked at various load ports 224 of factory interface 206. A factory interface robot 226 (shown dotted) can be configured to transfer substrates 202 between carriers (also referred to as containers) 222 and load lock 220. Carriers 222 can be a substrate storage carrier or a replacement part storage carrier.

Manufacturing system 200 can also be connected to a client device (not shown) that is configured to provide information regarding manufacturing system 200 to a user (e.g., an operator). In some embodiments, the client device can provide information to a user of manufacturing system 200 via one or more graphical user interfaces (GUIs). For example, the client device can provide information regarding a target thickness profile for a film to be deposited on a surface of a substrate 202 during a deposition process performed at a process chamber 214, 216, 218 via a GUI. The client device can also provide information regarding a modification to a process recipe in view of a respective set of deposition settings predicted to correspond to the target profile, in accordance with embodiments described herein.

Manufacturing system 200 can also include a system controller 228. System controller 228 can be and/or include a computing device such as a personal computer, a server computer, a programmable logic controller (PLC), a microcontroller, and so on. System controller 228 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 228 can include a data storage device (e.g., one or more disk drives and/or solid state drives), a main memory, a static memory, a network interface, and/or other components. System controller 228 can execute instructions to perform any one or more of the methodologies and/or embodiments described herein. In some embodiments, system controller 228 can execute instructions to perform one or more operations at manufacturing system 200 in accordance with a process recipe. The instructions can be stored on a computer readable storage medium, which can include the main memory, static memory, secondary storage and/or processing device (during execution of the instructions).

System controller 228 can receive data from sensors included on or within various portions of manufacturing system 200 (e.g., processing chambers 214, 216, 218, transfer chamber 210, load lock 220, etc.). System controller 228 can interface to controls included on or within various portions of manufacturing system 200 (e.g., processing chambers 214, 216, 218, transfer chamber 210, load lock 220, etc.). In some embodiments, data received by the system controller 228 can include spectral data and/or non-spectral data for a portion of substrate 202. In other or similar embodiments, data received by the system controller 228 can include data associated with processing substrate 202 at processing chamber 214, 216, 218, as described previously. For purposes of the present description, system controller 228 is described as receiving data from sensors included within process chambers 214, 216, 218. However, system controller 228 can receive data from any portion of manufacturing system 200 and can use data received from the portion in accordance with embodiments described herein. In an illustrative example, system controller 228 can receive data from one or more sensors for process chamber 214, 216, 218 before, after, or during a substrate process at the process chamber 214, 216, 218. Data received from sensors of the various portions of manufacturing system 200 can be stored in a data store 250. Data store 250 can be included as a component within system controller 228 or can be a separate component from system controller 228. In some embodiments, data store 250 can be data store 140 described with respect to FIG. 1.

Manufacturing system 200 can also include a tool server 227. Tool server 227 can include one or more computing devices such as a rackmount server, a router computer, a server computer, a personal computer, a mainframe computer, a laptop computer, a tablet computer, a desktop computer, a GPU, an ASIC, etc. Tool server 227 can include a data storage device (e.g., one or more disk drives and/or solid state drives), a main memory, a static memory, a network interface, and/or other components. Tool server 227 can execute instructions to perform any one or more of the methodologies and/or embodiments described herein. In some embodiments, tool server 227 can execute instructions to perform one or more data collection operations at manufacturing system 200 in accordance with a request from an evaluation system. The instructions can be stored on a computer readable storage medium, which can include the main memory, static memory, secondary storage and/or processing device (during execution of the instructions). In some embodiments, tool server 227 can be similar to or the same as tool server 127.

In some embodiments, tool server 227 can store one or more evaluation systems. An evaluation system can include a machine learning model (e.g., model 790 and/or predictive server 712 of FIG. 7), an inference engine, a heuristics model, an algorithm, a physics-based model, etc. In some embodiments, one or more evaluations systems can be trained and/or stored on tool server 227. In some embodiments, one or more evaluation systems can be trained and/or stored on an external server (not shown) in communication with the server 227.

Tool server 227 can include a communication node 232 configured to interface between one or more evaluation systems 234 and process tool 204. In particular, communication node 232 can be configured to bridge data from process tool 204 (e.g., from the tool data bus) to evaluation systems 234 with low latency (e.g., approximately one millisecond). In some embodiments, communication node 232 can communicate with evaluation systems 234 and with process tool 204 using Remote Procedure Calls (RPCs).

A RPC is a communication protocol that one program can use to request a service from a program located in another computer on a network without having to understand the network's details or the specifics of the other computer program. In particular, RPCs are used to call other processes on the remote systems like a local system. In some embodiments, a RPC can include a GRPC (Google® Remote Procedure Call), JSON-RPC (JavaScript Object Notation RPC), XML-RPC (Extensible Markup Language RPC), etc. In some embodiments, communication node 232 can communicate with evaluation systems 234 using other software communication protocols (e.g., Remote Method Invocation (RMI), inter-process communication (IPC), etc.

In some embodiments, communication node 232 can receive, from evaluation system 234, one or more desired attributes that the evaluation system desires from process tool 204. The attributes can include any recordable data desired by the evaluation system, such as, but not limited to, inputs used by the process tool, outputs generated from the process tool (e.g., metrology data, sensor data, metadata, time data, etc.), control modes, recipe set-points to be monitored (e.g., one or more processes during a recipe which trigger a data retrieval or recordation process by communication node 232), equipment constants to be monitored, observable data on other tool sub-systems to be monitored, etc.

Communication node 232 can generate a monitoring device, which is any software program capable of retrieving data from process tool 204. In some embodiments, the monitoring device can include a device driver, an application programming interface (API), a software application, a virtual device (e.g., a virtual peripheral device), an image file, firmware, etc. Communication node 232 can configure the monitoring device to retrieve data, from process tool 204, based on the received attributes. In some embodiments, the monitoring device can be configured to retrieve externals sensors data from one or more sensors interfaced with the process tool. The external sensors can be operated by an evaluation system, by the monitoring device, or by any other system independent of system controller 228.

In some embodiments, communication node 232 can register the monitoring device on the frontend server software (FES) of the process tool rather than on the real-time control system (e.g., backend) of the process tool. The monitoring device can be registered to only collect data that is meant for the evaluation system(s), as indicated by the DCP. Using the monitoring device, the communication node can retrieve or receive the desired data directly from the process tool. Further, registering the monitoring device with the FES enables the communication node to connect to the process tool without causing software changes to the process tool.

In some embodiments, communication node 232 can include multiple components to bridge data between process tool 204 and the evaluation system(s). In one such embodiment, tool server 227 can include an edge node and a gateway node. The edge node can perform query functions, data collection functions, and monitoring device related functions, as discussed above. The gateway node can perform multiplexing functions between the edge node and multiple evaluation systems. In particular, the gateway node can facilitate complexity management with multiple process chambers running difference evaluation algorithms. Multiplexing can be a method by which multiple signals are combined into one signal over a shared medium (e.g., communication channel).

Figure 3:
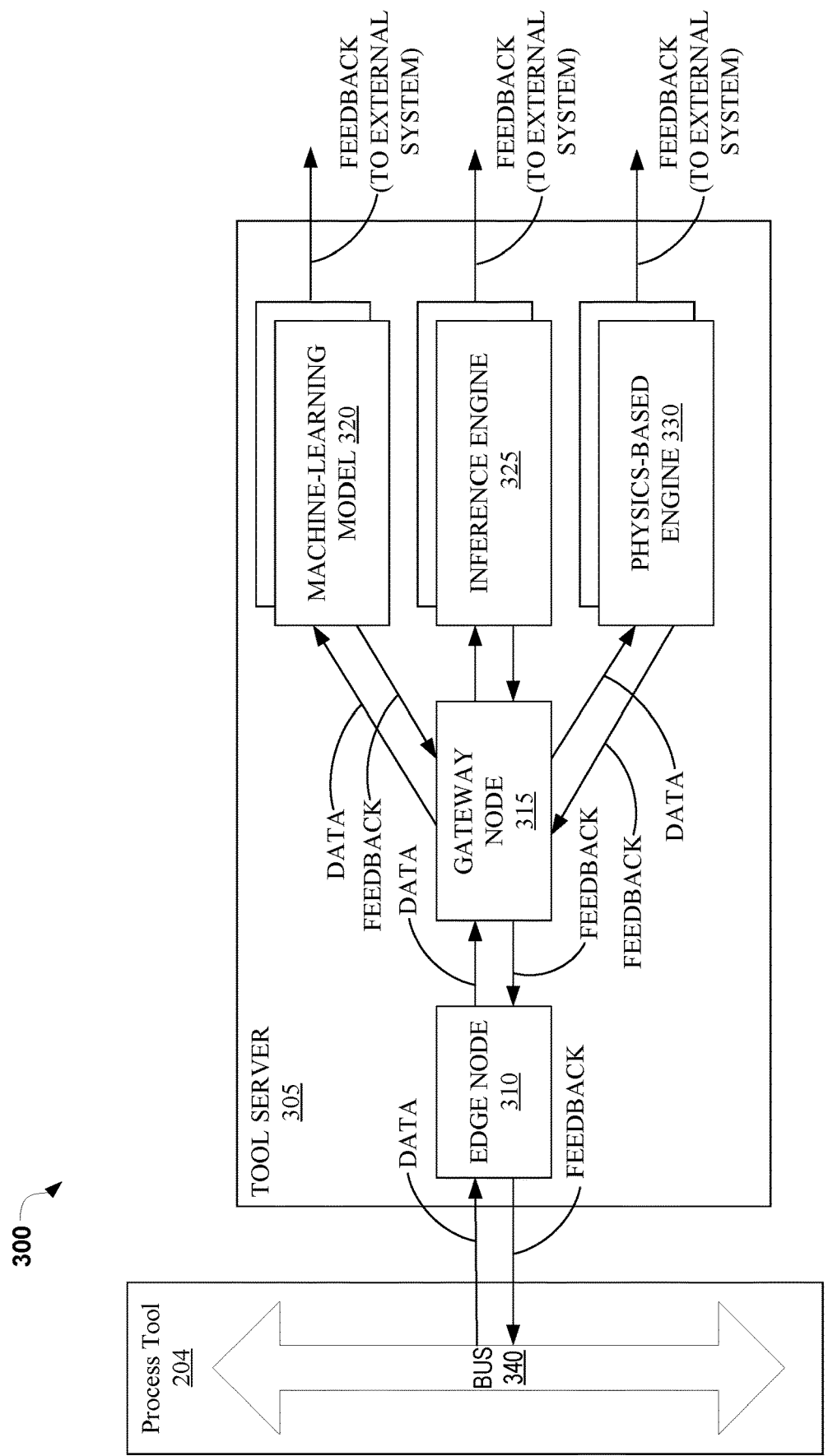
FIG. 3 is a diagram showing an example tool server, according to aspects of the present disclosure, according to certain embodiments.

FIG. 3 is block diagram 300 showing an example tool server 305, according to aspects of the present disclosure. Tool server 305 can include edge node 310, gateway node 315, and one or more evaluation systems, such as one or more machine learning models 320, one or more inference engines 325, and one or more physics-based engines 330. Tool server 305 can be in communication with process tool 204 via, for example, process tool bus 340. In some embodiments, edge node 310 can request gateway node 315 to query each evaluation system (e.g., machine learning models 320, inference engines 325, physics-based engine 330, etc.) for attributes. Gateway node 315 can receive the attributes from each evaluation system, and send the attributes to edge node 310. In some embodiments, each set of attributes for each evaluation system can include one or more tags (e.g., metadata, headers, etc.) indicative of the corresponding evaluation system. The tags can be used to identify to which evaluation system data from the process tool is to be sent. Edge node 310 can then generate a monitoring device for each evaluation system based on the received corresponding set of received attributes, and register each monitoring device on the process tool bus 340. Each monitoring device can include a DCP (data collection plan) in accordance with the respective attributes. Each monitoring device can be maintained by and/or reside on the edge node Process tool bus 340 can be a system bus that connects components of the process tool and/or the manufacturing system. In some embodiments, process tool bus 340 can be in communication with one or more sensor (e.g., sensors 126), a data system, a control system (e.g., system controller 228), system controls, etc. During execution of a recipe by the process tool, each monitoring device can retrieve the data indicated by their respective DCPs from process tool 204, and then edge node 310 can send the data to gateway node 315. Gateway node 315 can then sort the data and send the corresponding data to each respective evaluation system. For example, according to a DCP generated for machine-learning model 320, a monitoring device can receive, from process tool bus 340, corresponding data (e.g., system data) and edge node 310 can send the corresponding data to gateway node 315. Gateway node 315 can determine which evaluation system is to receive the data using, for example, the tags, and forward the data to the appropriate evaluation system (e.g., machine-learning model 320).

In some embodiments, the evaluation system can process the received system data and generate feedback data. The feedback data can include any meaningful finding that results from analyzing data. For example, the feedback data can include predictive data, diagnostic data (e.g., data indicative of an issue associated with the manufacturing equipment), a corrective action, optimization data (data indicative of how to optimize one or more parameters or components of the manufacturing equipment), efficiency data (e.g., how efficient is a component of a manufacturing equipment), health data indicative of the health of a sub-system of a process chamber, etc. The health of a sub-system can be characterized as a current behavior (current sensor values) of the sub-system compared to an expected behavior (expected sensor values) of the sub-system. A sub-system can be characterized as a set of attributes related with an operational parameter of the process chamber, such as a temperature, a flow rate, a pressure, and so forth.

The feedback data can then be sent to the process tool via the gateway node 315 and/or the edge node 310. In some embodiments, process tool 204 can perform one or more actions based on the feedback data. For example, process tool 204 can adjust a recipe parameter, adjust a process chamber parameter, generate an alert, etc. based on the feedback. In some embodiments, tool server 305 can send the feedback data to an external system. In some embodiments, an external system includes a client device 120, an external server, an external computer system, etc.

In some embodiments, each component of block diagram 300 can communicate with other components using RPC messages. For example, the evaluation systems communicate with gateway node 315 (e.g., can send attribute data, send feedback data, receive sensor data, etc.) using RPC messages. In another example, gateway node 315 can communicate with edge node 310 using RPC messages. In yet another example, process tool 204 can communicate with edge node 310 using RPC messages. In other embodiments, evaluation systems can send feedback data using other means of wireless or wired communication.

Figure 4:
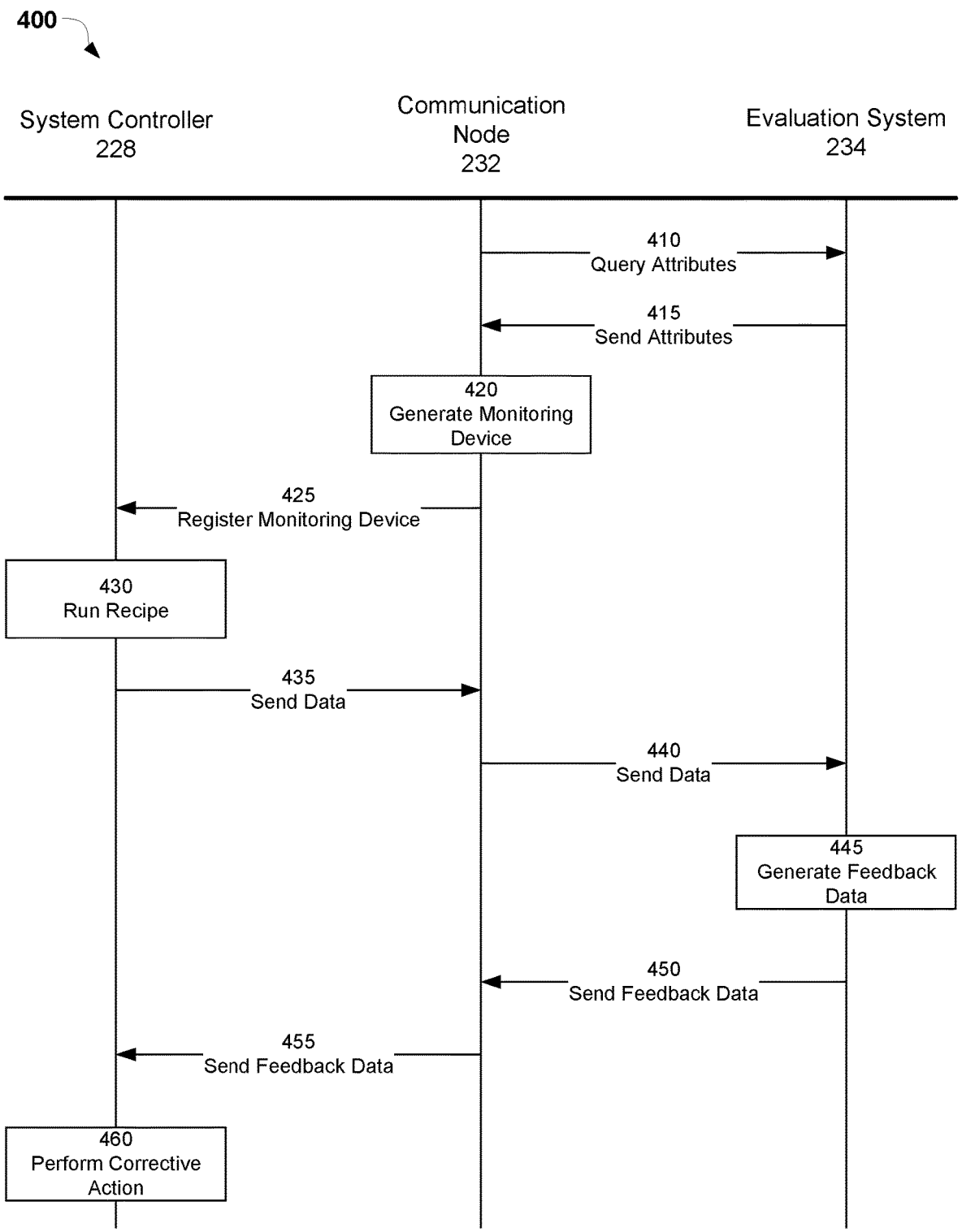
FIG. 4 is an interaction diagram illustrating processing data received from a monitoring device to generate and send feedback to a process tool, according to certain embodiments.

FIG. 4 is an interaction diagram 400 illustrating processing data received from a monitoring device to generate and send feedback to a process tool, according to aspects of the present disclosure. The interaction diagram 400 includes blocks that may be understood as being similar to blocks of a flow diagram of a method. Thus, if performed as a method, the blocks shown in the interaction diagram 400 (blocks that perform operations), the method and each of its individual functions, routines, subroutines, or operations may be performed by one or more processors of a computer device executing the method.

The blocks shown in diagram 400 can be performed by processing logic that can include hardware (circuitry, dedicated logic, etc.), software (such as is run on a general purpose computer system or a dedicated machine), firmware, or some combination thereof. In one implementation, the blocks shown in diagram 400 can be performed by a computer system, such as computer system architecture 100 of FIG. 1 or manufacturing system 200 of FIG. 2. In other or similar implementations, one or more operations of the blocks shown in diagram 400 can be performed by one or more other machines not depicted in the figures. In some aspects, one or more operations of the blocks shown in diagram 400 can be performed by system controller 228, communication node 232, and evaluation system 234 of FIG. 2.

At operation 410, communication node 232 can query evaluation system 234 for one or more attributes. In an example, communication node 232 can send a request to one or more evaluation system (e.g., evaluation system 234) for a list of attributes that each evaluation system desires from the process tool (or the manufacturing system).

At operation 415, evaluation system 234 can send the list of attributes to communication node 232. The attributes can include inputs used by the process tool, outputs generated from the process tool (e.g., metrology data, sensor data, metadata, time data, etc.), control modes, recipe set-points to be monitored, equipment constants to be monitored, observable data on other tool sub-systems to be monitored, etc.

At operation 420, communication node 220 can generate or otherwise provide a monitoring device. The monitoring device can be any software program capable of retrieving or intercepting data from the process tool. The communication node can then configure, based on the received attributes, the monitoring device with a DCP to collect certain sensor data, event data, constants data, and settings data from the process tool. The monitoring device can be executed from and maintained by communication node 232.

At operation 425, communication node 232 can register the monitoring device on system controller 228. For example, communication node 232 can register the monitoring device on the FES of system controller 228. In some embodiments, once registered, the monitoring device initially send pre-run data to the communication node. The pre-run data can include configuration parameters, tool data, or any other data, requested by the DCP, which can be send prior to execution of a recipe.

At operation 430, system controller 228 can run a process recipe. A process recipe defines a particular set of operations to be performed for the substrate during a process and can include one or more settings associated with each operation. For example, a deposition process recipe can include a temperature setting for the process chamber, a pressure setting for the process chamber, a flow rate setting for a precursor for a material included in the film deposited on the substrate surface, etc. In some embodiments, responsive to the execution of the process recipe, communication node 232 can send an indication to evaluation system 234 that the execution has begun. Evaluation system 234 can then execute one or more sensor drivers to receive data from the monitoring device.

At operation 435, the monitoring device (which is registered on system controller 228) can retrieve and collect manufacturing data as indicated by the DCP. As manufacturing data is generated by the process tool, the monitoring device can obtain the manufacturing data from, for example, the process tool bus. The monitoring device can monitor for specific types of data based on the DCP. In some embodiments, the data can be sent in response to a trigger. For example, the monitoring device can monitor the process tool bus for one or more steps of a named process recipe starting at a specified process chamber. Once the one or more steps are detected, the monitoring device (via communication node 232) can trigger evaluation system 234 using a signal and send data defined by the DCP. The trigger can be defined by the list of attributes and/or by the DCP. A trigger can include a trigger function such as a special type of stored procedure that automatically runs when an event occurs. In another example, a trigger can be assigned to a process recipe (e.g., installed or set up on system controller 228), where the trigger indicates one or more process recipe steps to activate the monitoring device. Responsive to the trigger activating, (e.g., the process recipe set being initiated by system controller 228), or responsive to receiving an indication associated with an output of the trigger, a signal can be sent from system controller 228 to communication node 232 instructing the monitoring device to activate and/or initiate data collection operations. In some embodiments, multiple triggers can be generated by the monitoring device.

At operation 440, communication node 232 can send the received data to evaluation system 234. It is noted that only one evaluation system is discussed with respect to diagram 400. However, one or more operations of the blocks shown in diagram 400 can be performed using multiple evaluation systems, as discussed with respect to FIG. 3.

At operation 445, evaluation system 234 can process the received data to generate feedback data (e.g., predictive data, corrective actions, etc.). For example, processing logic can apply a machine-learning model to the input data. The machine-learning model can then generate output data (e.g., one or more output values) indicative of predicative data and/or a type of corrective action to perform to correct the suspected issue or failure indicated by the predicative data. The corrective action can change and/or update one or more parameters of the process recipe or the process chamber. For example, the correction profile can include an adjustment to the temperature setting for the process chamber, the pressure setting for the process chamber, the flow rate setting for a precursor for a material included in the film deposited on the substrate surface, to the power supplied to the process chamber, to the ratio of two or more settings, etc.

At operation 450, evaluation system 234 can send the feedback data to communication node 232. At operation 455, evaluation system 234 can send the feedback data to system controller 228. In some embodiments, system controller 228 can perform (or suggest) a corrective action referenced by the feedback data. In some embodiments, the corrective action can be determined based on data obtained from the fault library. In some embodiments, the corrective action can include generating an alert or an indication of the determined problem. In some embodiments, the corrective action can include the processing logic adjusting one or more parameters (e.g., a temperature setting for the process chamber, a pressure setting for the process chamber, a flow rate setting for a precursor for a material included in the film deposited on the substrate surface, etc.) of a deposition process recipe, an etch process recipe, or any other process recipe based on a desired property for the film. In some embodiments, the process recipe can be adjusted before, during (e.g., in real time) or after completion of the process recipe.

Figure 5:
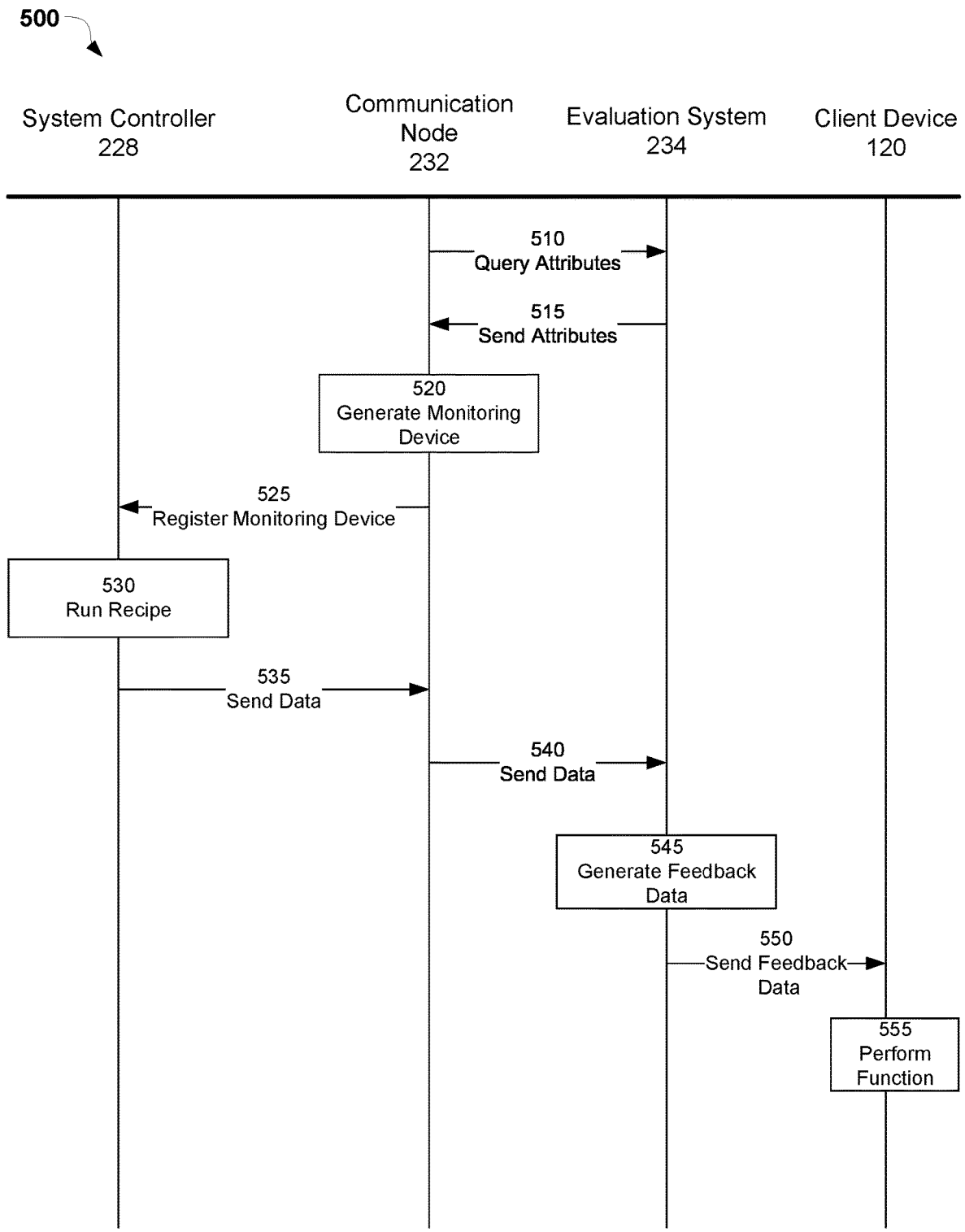
FIG. 5 is an interaction diagram illustrating processing data received from a monitoring device to generate and send feedback to a client device, according to certain embodiments.

FIG. 5 is an interaction diagram 500 illustrating processing data received from a monitoring device to generate and send feedback to a client device, according to aspects of the present disclosure. The interaction diagram 500 includes blocks that may be understood as being similar to blocks of a flow diagram of a method. Thus, if performed as a method, the blocks shown in the interaction diagram 500 (blocks that perform operations), the method and each of its individual functions, routines, subroutines, or operations may be performed by one or more processors of a computer device executing the method.

The blocks shown in diagram 500 can be performed by processing logic that can include hardware (circuitry, dedicated logic, etc.), software (such as is run on a general purpose computer system or a dedicated machine), firmware, or some combination thereof. In one implementation, the blocks shown in diagram 500 can be performed by a computer system, such as computer system architecture 100 of FIG. 1 or manufacturing system 200 of FIG. 2. In other or similar implementations, one or more operations of the blocks shown in diagram 500 can be performed by one or more other machines not depicted in the figures. In some aspects, one or more operations of the blocks shown in diagram 500 can be performed by system controller 228, communication node 232, and evaluation system 234 of FIG. 2. In some embodiments, operations 510 through 540 of FIG. 5 can be similar to those of operations 410 through 440 of FIG. 4.

At operation 510, communication node 232 can query evaluation system 234 for one or more attributes. In an example, communication node 232 can send a request to one or more evaluation system (e.g., evaluation system 234) for a list of attributes that each evaluation system desires from the process tool (or the manufacturing system).

At block 515, evaluation system 234 can send the list of attributes to communication node 232. The attributes can include inputs used by the process tool, outputs generated from the process tool (e.g., metrology data, sensor data, metadata, time data, etc.), control modes, recipe set-points to be monitored, equipment constants to be monitored, observable data on other tool sub-systems to be monitored, etc.

At block 520, communication node 220 can generate or otherwise provide a monitoring device. The monitoring device can be any software program capable of retrieving or intercepting data from the process tool. The communication node can then configure, based on the received attributes, the monitoring device with a DCP to collect certain sensor data, event data, constants data, and settings data from the process tool.

At block 525, communication node 232 can register the monitoring device on system controller 228. For example, communication node 232 can register the monitoring device on the FES of system controller 228. In some embodiments, once registered, the monitoring device initially send pre-run data to the communication node. The pre-run data can include configuration parameters, tool data, or any other data, requested by the DCP, which can be send prior to execution of a recipe.

At block 530, system controller 228 can run a process recipe. A process recipe defines a particular set of operations to be performed for the substrate during a process and can include one or more settings associated with each operation. For example, a deposition process recipe can include a temperature setting for the process chamber, a pressure setting for the process chamber, a flow rate setting for a precursor for a material included in the film deposited on the substrate surface, etc. In some embodiments, responsive to the execution of the process recipe, communication node 232 can send an indication to evaluation system 234 that the execution has begun. Evaluation system 234 can then execute one or more sensor drivers to receive data from the monitoring device.

At block 535, the monitoring device (which is registered on system controller 228) can send data to communication node 232 associated with the DCP. As data is generated by the process tool, the monitoring device can obtain the data from, for example, the process tool bus. The monitoring device can listen for specific types of data based on the DCP. In some embodiments, the data can be sent in response to a trigger. For example, the monitoring device can monitor the process tool bus for one or more steps of a named process recipe starting at a specified process chamber. Once the one or more steps are detected, the monitoring device (via communication node 232) can trigger evaluation system 234 using a signal and send data defined by the DCP. The trigger can be defined by the list of attributes and/or by the DCP.

At block 540, communication node 232 can send the received data to evaluation system 234. It is noted that only one evaluation system is discussed with respect to diagram 400. However, one or more operations of the blocks shown in diagram 400 can be performed using multiple evaluation systems, as discussed with respect to FIG. 3.

At block 545, evaluation system 234 can process the received data to generate feedback data. For example, processing logic can apply a machine-learning model or a physics-based engine to the input data. The machine-learning model or physics-based engine can then generate output data (e.g., one or more output values) indicative of predictive data, diagnostic data, optimization data, efficiency data, and/or health data associated with the manufacturing equipment (e.g., manufacturing equipment 126). In another embodiment, the feedback data can include a suggested corrective action indicative of an action to perform to correct the suspected issue or failure.

At block 550, evaluation system 234 can send the feedback to client device 120. At block 555, client device 120 can perform a function using and/or based on the feedback data. For example, client device 120 can display the feedback data (e.g., display diagnostic data, display a suggested corrective action, etc.), execute the feedback data (e.g., execute a corrective action, update a process recipe, etc.), or perform any other function associated with the feedback data. In some embodiments, client device can perform the function using corrective action component 122.

Figure 6:
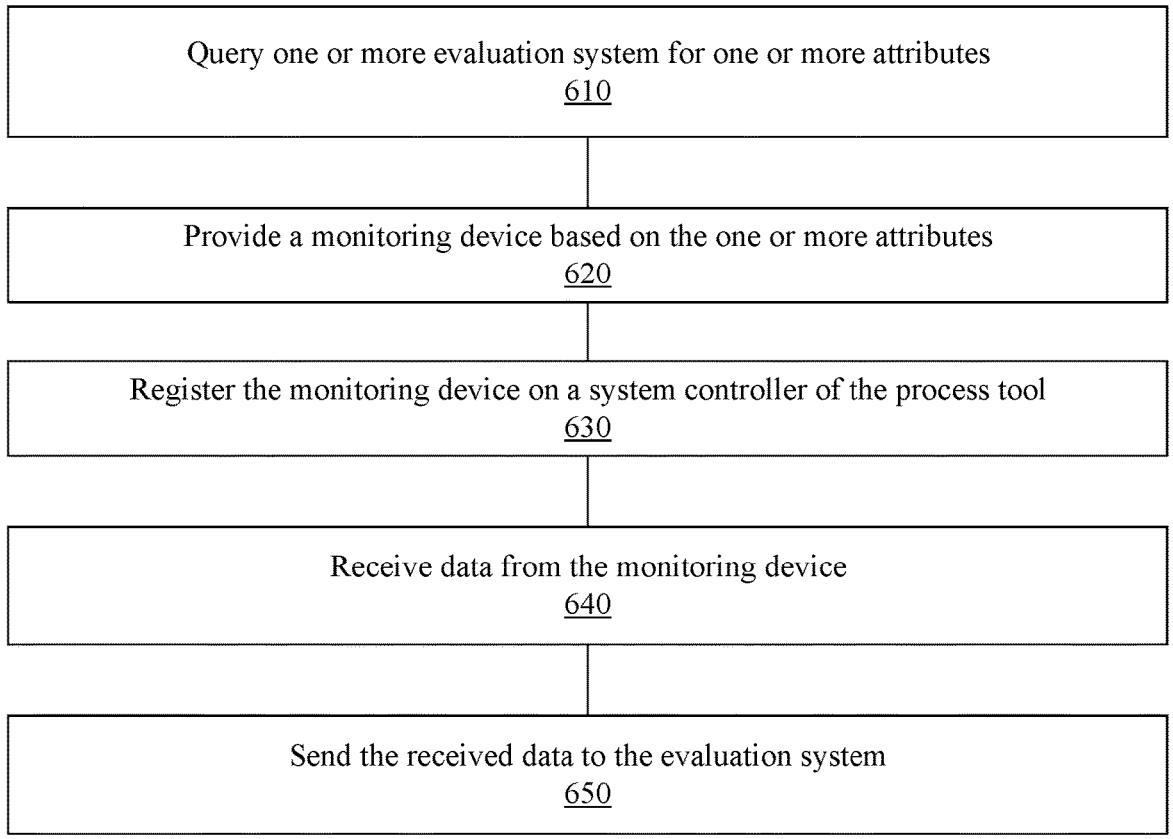
FIG. 6 is a flow chart of a method for generating a monitoring device, according to certain embodiments.

FIG. 6 is a flow chart of a method 600 for generating a monitoring device, according to aspects of the present disclosure. Method 600 is performed by processing logic that can include hardware (circuitry, dedicated logic, etc.), software (such as is run on a general purpose computer system or a dedicated machine), firmware, or some combination thereof. In one implementation, method 600 can be performed by a computer system, such as computer system architecture 100 of FIG. 1. In other or similar implementations, one or more operations of method 600 can be performed by one or more other machines not depicted in the figures. In some aspects, one or more operations of method 600 can be performed by manufacturing equipment 124 and/or tool server 227.

At operation 610, the processing logic queries one or more evaluation system for one or more attributes. For example, the processing logic can send a request to one or more evaluation system for a list of attributes that each evaluation system desires from a process tool. Each set of attributes for each evaluation system can include one or more tags (e.g., metadata, headers, etc.) indicative of the corresponding evaluation system.

At operation 620, the processing logic provides a monitoring device based on the one or more attributes. The monitoring device can be any software program capable of retrieving or intercepting data from the process tool. The processing logic can configure the monitoring device with a DCP to collect certain sensor data, event data, alert data, and settings data from the process tool. The DCP can be based on the received attributes.

At operation 630, the processing logic registers the monitoring device on a system controller of the process tool. For example, the processing logic can install the monitoring device on the FES of the manufacturing system and/or process tool. The monitoring device can listen for specific types of data based on the DCP.

At operation 640, the processing logic can receive data from the monitoring device. For example, the monitoring device can monitor the process tool bus specific types of data associated with the DCP, for specific triggers (e.g., initiation of process recipe steps), etc. Data corresponding to the triggers and/or the DCP can be received by the processing logic.

At operation 650, the processing logic can send the received data to the evaluation system. The evaluation system can then process the received data to generate feedback data, such as predictive data and/or corrective actions.

FIG. 7 depicts an illustrative predictive system 700, according to aspects of the present disclosure. The predictive system 700 can be used to generate predictive data, to provide model adaptation, to use a knowledge base, etc. Predictive server 712 can be part of a predictive system 710 and can be an embodiment of an evaluation system (e.g., evaluation system 234. The predictive system 710 can further include server machines 770 and 780.

The predictive server 712, server machine 770, and server machine 780 can each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 770 includes a training set generator 772 that is capable of generating training data sets (e.g., a set of data inputs and a set of target outputs) to train, validate, and/or test a machine-learning model 790. Machine-learning model 790 can be any algorithmic model capable of learning from data. In some embodiments, the data set generator 772 can partition the training data into a training set, a validating set, and a testing set. In some embodiments, the predictive system 710 generates multiple sets of training data.

Server machine 780 can include a training engine 782, a validation engine 784, a selection engine 785, and/or a testing engine 786. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 782 can be capable of training one or more machine-learning models 790. Machine-learning model 790 can refer to the model artifact that is created by the training engine 782 using the training data (also referred to herein as a training set) that includes training inputs and corresponding target outputs (correct answers for respective training inputs). The training engine 782 can find patterns in the training data that map the training input to the target output (the answer to be predicted), and provide the machine-learning model 790 that captures these patterns. The machine-learning model 790 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

One type of machine learning model that can be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities can be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks can learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a plasma process tuning, for example, the raw input can be process result profiles (e.g., thickness profiles indicative of one or more thickness values across a surface of a substrate); the second layer can compose feature data associated with a status of one or more zones of controlled elements of a plasma process system (e.g., orientation of zones, plasma exposure duration, etc.); the third layer can include a starting recipe (e.g., a recipe used as a starting point for determining an updated process recipe the process a substrate to generate a process result the meets threshold criteria). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs can be that of the network and can be the number of hidden layers plus one. For recurrent neural networks, in which a signal can propagate through a layer more than once, the CAP depth is potentially unlimited.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future flow rate measurements and make predictions based on this continuous metrology information. RNNs can be trained using a training dataset to generate a fixed number of outputs (e.g., to determine a set of substrate processing rates, determine modification to a substrate process recipe). One type of RNN that can be used is a long short term memory (LSTM) neural network.

Training of a neural network can be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

A training dataset containing hundreds, thousands, tens of thousands, hundreds of thousands or more sensor data and/or process result data (e.g., metrology data such as one or more thickness profiles associated with the sensor data) can be used to form a training dataset.

To effectuate training, processing logic can input the training dataset(s) into one or more untrained machine learning models. Prior to inputting a first input into a machine learning model, the machine learning model can be initialized. Processing logic trains the untrained machine learning model(s) based on the training dataset(s) to generate one or more trained machine learning models that perform various operations as set forth above. Training can be performed by inputting one or more of the sensor data into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences. For example, an output prediction or inference can include one or more predictions of film buildup on chamber components, erosion of chamber components, predicted failure of chamber components, and so on. Processing logic determines an error (i.e., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy can be, for example, 70%, 80% or 90% accuracy. In one embodiment, the stopping criterion is met if accuracy of the machine learning model has stopped improving. If the stopping criterion has not been met, further training is performed. If the stopping criterion has been met, training can be complete. Once the machine learning model is trained, a reserved portion of the training dataset can be used to test the model.

Once one or more trained machine learning models 790 are generated, they can be stored in predictive server 712 as predictive component 714 or as a component of predictive component 714.

The validation engine 784 can be capable of validating machine-learning model 790 using a corresponding set of features of a validation set from training set generator 772. Once the model parameters have been optimized, model validation can be performed to determine whether the model has improved and to determine a current accuracy of the deep learning model. The validation engine 784 can determine an accuracy of machine-learning model 790 based on the corresponding sets of features of the validation set. The validation engine 784 can discard a trained machine-learning model 790 that has an accuracy that does not meet a threshold accuracy. In some embodiments, the selection engine 785 can be capable of selecting a trained machine-learning model 790 that has an accuracy that meets a threshold accuracy. In some embodiments, the selection engine 785 can be capable of selecting the trained machine-learning model 790 that has the highest accuracy of the trained machine-learning models 790.

The testing engine 786 can be capable of testing a trained machine-learning model 790 using a corresponding set of features of a testing set from data set generator 772. For example, a first trained machine-learning model 790 that was trained using a first set of features of the training set can be tested using the first set of features of the testing set. The testing engine 786 can determine a trained machine-learning model 790 that has the highest accuracy of all of the trained machine-learning models based on the testing sets.

As described in detail below, predictive server 712 includes a predictive component 714 that is capable of providing data indicative of the expected behavior of each sub-system of a process chamber, and running trained machine-learning model 790 on the current sensor data input to obtain one or more outputs. The predictive server 712 can further provide data indicative of the health of the process chamber sub-system and diagnostics. This will be explained in further detail below.

Predictive server 112, server machine 170, and server machine 180 can be coupled to each other (or to client device 120, manufacturing equipment 124, metrology equipment 128, and/or data store 140) via a network (e.g., network 130. In some embodiments, network 130 provides client device 120 and/or tool server 127 with access to predictive server 112.

It should be noted that in some other implementations, the functions of server machines 770 and 780, as well as predictive server 712, can be provided by a fewer number of machines. For example, in some embodiments, server machines 770 and 780 can be integrated into a single machine, while in some other or similar embodiments, server machines 770 and 780, as well as predictive server 712, can be integrated into a single machine.

In general, functions described in one implementation as being performed by server machine 770, server machine 780, and/or predictive server 712 can also be performed on client device 120. In addition, the functionality attributed to a particular component can be performed by different or multiple components operating together.

Figure 8:
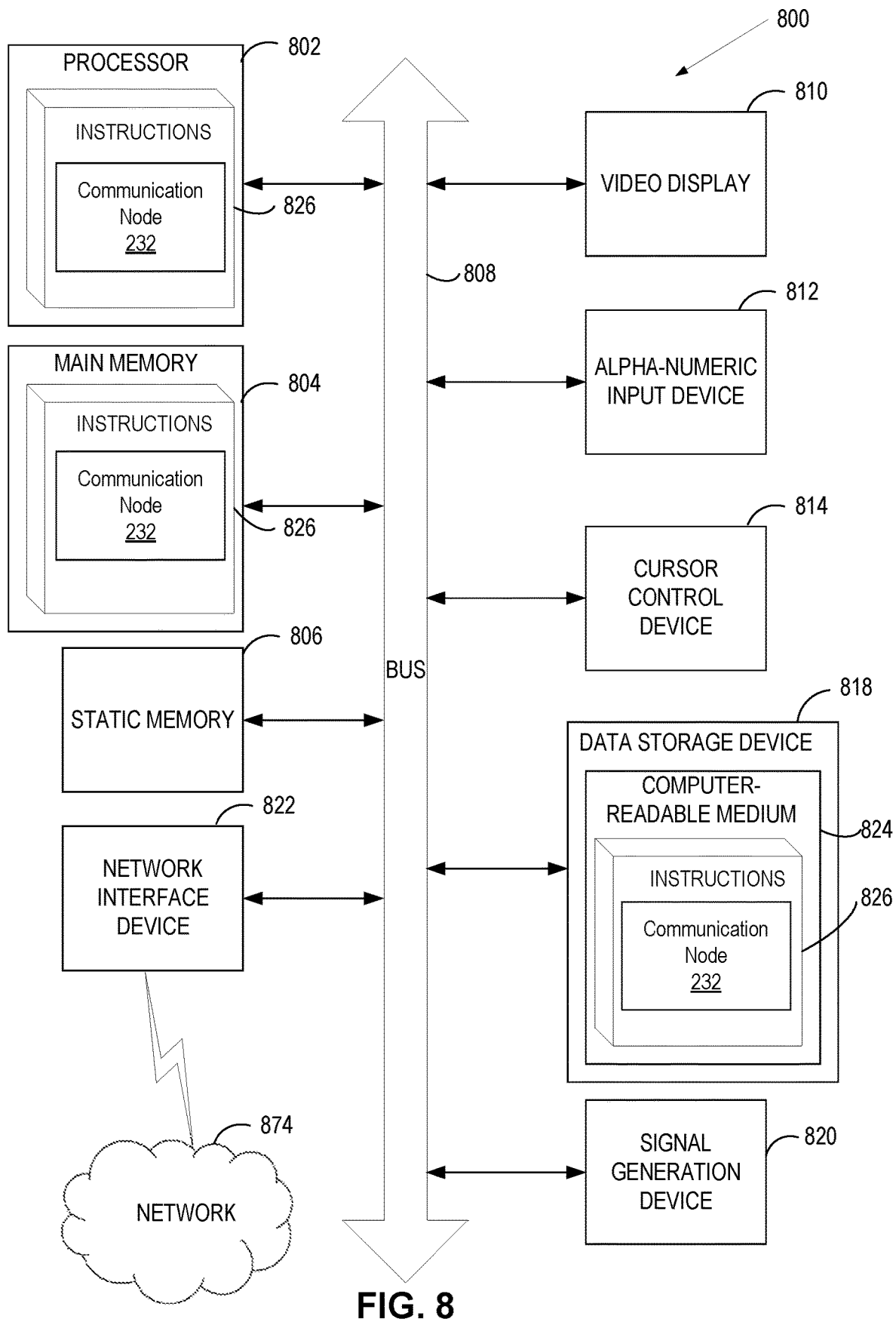
FIG. 8 is a block diagram illustrating a computer system, according to certain embodiments.

FIG. 8 is a block diagram illustrating a computer system 800, according to certain embodiments. In some embodiments, computer system 800 can be connected (e.g., via a network, such as a Local Area Network (LAN), an intranet, an extranet, or the Internet) to other computer systems. Computer system 800 can operate in the capacity of a server or a client computer in a client-server environment, or as a peer computer in a peer-to-peer or distributed network environment. Computer system 800 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 can include a processing device 802, a volatile memory 804 (e.g., Random Access Memory (RAM)), a non-volatile memory 806 (e.g., Read-Only Memory (ROM) or Electrically-Erasable Programmable ROM (EEPROM)), and a data storage device 816, which can communicate with each other via a bus 808.

Processing device 802 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 800 can further include a network interface device 822 (e.g., coupled to network 884). Computer system 800 also can include a video display unit 810 (e.g., an LCD), an alphanumeric input device 812 (e.g., a keyboard), a cursor control device 814 (e.g., a mouse), and a signal generation device 820.

In some implementations, data storage device 816 can include a non-transitory computer-readable storage medium 824 on which can store instructions 826 encoding any one or more of the methods or functions described herein, including instructions encoding components of FIG. 1 (e.g., communication node 232, etc.) and for implementing methods described herein.

Instructions 826 can also reside, completely or partially, within volatile memory 804 and/or within processing device 802 during execution thereof by computer system 800, hence, volatile memory 804 and processing device 802 can also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and can not have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. An electronic device manufacturing system, comprising:
   a process tool; and
   a tool server coupled to the process tool and comprising a communication node and an evaluation system, wherein the communication node is configured to:
      obtain one or more attributes from the evaluation system;
      provide a monitoring device comprising a data collection plan that is based on the one or more attributes;
      register the monitoring device with the process tool;
      receive, from the process tool, data based on the data collection plan; and
      send the received data to the evaluation system.

2. The electronic device manufacturing system of claim 1, wherein the communication node communicates with the evaluation system and the process tool using Remote Procedure Calls.

3. The electronic device manufacturing system of claim 1, wherein the communication node is further configured to:
   receive feedback data from the evaluation system, wherein the feedback data is generated based on the received data; and
   cause the process tool to perform a corrective action based on the feedback data.

4. The electronic device manufacturing system of claim 3, wherein the feedback data comprises at least one of predictive data, diagnostic data, corrective data, optimization data, efficiency data, or health data.

5. The electronic device manufacturing system of claim 1, wherein the communication node is further configured to:
   receive feedback data from the evaluation system, wherein the feedback data is generated based on the received data; and
   send the feedback data to a client device.

6. The electronic device manufacturing system of claim 1, wherein the monitoring device comprises at least one of a device driver, an application programming interface (API), a software application, a virtual device, an image file, or firmware.

7. The electronic device manufacturing system of claim 1, wherein the one or more attributes comprise at least one of an input used by the process tool, an output generated from the process tool, a control mode, a recipe set-point to be monitored, or an equipment constant to be monitored.

8. The electronic device manufacturing system of claim 1, wherein the evaluation system comprises at least one of a machine learning model, an inference engine, a heuristics model, a physics-based engine, or an algorithm.

9. The electronic device manufacturing system of claim 1, wherein the monitoring device is registered with a frontend server of the process tool.

10. The electronic device manufacturing system of claim 1, wherein the monitoring device is configured to obtain the received data from a system bus of the process tool.

11. The electronic device manufacturing system of claim 1, wherein the communication node comprises a gateway node configured to generate the monitoring device, and a gateway node configured to communicate with a plurality of evaluation systems.

12. The electronic device manufacturing system of claim 1, wherein the communication node if further configured to:
register the monitoring device with the process tool without causing software changes to the process tool.

13. The electronic device manufacturing system of claim 1, wherein the communication node is further configured to:
assign, to a process recipe step of a process recipe, a trigger function; and
responsive to receiving an indication associated with an output of the trigger function, initiating, via the monitoring device, data collection operations.

14. A method, comprising:
obtaining, by a processing device, one or more attributes from an evaluation system;
providing a monitoring device comprising a data collection plan that is based on the one or more attributes;
registering the monitoring device with a process tool;
receiving, from the process tool, data based on the data collection plan; and
sending the received data to the evaluation system.

15. The method of claim 14, further comprising:
receiving feedback data from the evaluation system, wherein the feedback data is generated based on the received data; and
causing the process tool to perform a corrective action based on the feedback data.

16. The method of claim 14, further comprising:
receiving feedback data from the evaluation system, wherein the feedback data is generated based on the received data; and
sending the feedback data to a client device.

17. The method of claim 14, wherein the monitoring device comprises at least one of a device driver, an application programming interface (API), a software application, a virtual device, an image file, or firmware.

18. The method of claim 14, wherein the monitoring device is registered with a frontend server of the process tool.

19. The method of claim 14, wherein the monitoring device is configured to obtain the received data from a system bus of the process tool.

* * * * *